US012608905B2

(12) United States Patent
Kakishita et al.

(10) Patent No.: US 12,608,905 B2
(45) Date of Patent: Apr. 21, 2026

(54) IMAGE PROCESSING DEVICE AND METHOD, AND IMAGE PROCESSING SYSTEM

(71) Applicant: HITACHI HIGH-TECH CORPORATION, Tokyo (JP)

(72) Inventors: Yasuki Kakishita, Tokyo (JP); Hideharu Hattori, Tokyo (JP); Yoichiro Suzuki, Tokyo (JP); Hidetsugu Tanoue, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 313 days.

(21) Appl. No.: 18/572,539

(22) PCT Filed: Jun. 23, 2022

(86) PCT No.: PCT/JP2022/025146
§ 371 (c)(1),
(2) Date: Dec. 20, 2023

(87) PCT Pub. No.: WO2023/276853
PCT Pub. Date: Jan. 5, 2023

(65) Prior Publication Data
US 2024/0119698 A1 Apr. 11, 2024

(30) Foreign Application Priority Data

Jul. 2, 2021 (JP) ................................. 2021-110546

(51) Int. Cl.
*G06V 10/44* (2022.01)
*G06V 10/771* (2022.01)

(52) U.S. Cl.
CPC ............ *G06V 10/44* (2022.01); *G06V 10/771* (2022.01); *G06V 2201/07* (2022.01)

(58) Field of Classification Search
None
See application file for complete search history.

(56) References Cited

U.S. PATENT DOCUMENTS

2012/0194697 A1 8/2012 Hasegawa et al.
2013/0259310 A1 10/2013 Tsukamoto et al.
(Continued)

FOREIGN PATENT DOCUMENTS

JP 2012113460 A 6/2012
JP 2013210967 A 10/2013
(Continued)

OTHER PUBLICATIONS

Extended European Search Report issued on Apr. 16, 2025 for European Patent Application No. 22833000.7.
(Continued)

*Primary Examiner* — Darryl V Dottin
(74) *Attorney, Agent, or Firm* — Volpe Koenig

(57) ABSTRACT

An image processing device includes: an image reception unit for receiving an input image; an image generation unit for generating an image for extracting a feature from the input image; a feature extraction unit for extracting a feature from the generation image generated by the image generation unit; an identification unit for identifying an object in the image using the feature output from the feature extraction unit; an output unit for outputting an identification result output from the identification unit; and a feature map generation unit for instructing the image generation unit generating a new generation image based on the feature output from the feature extraction unit, and generating a feature map indicating a feature extraction condition for the new generation image and output the generated feature map
(Continued)

to the feature extraction unit. With this configuration, a target object in the image is identified quickly and accurately.

15 Claims, 16 Drawing Sheets

(56)                References Cited

U.S. PATENT DOCUMENTS

| | | |
|---|---|---|
| 2014/0270349 A1 | 9/2014 | Amtrup et al. |
| 2015/0262368 A1 | 9/2015 | Irie et al. |
| 2021/0042933 A1 | 2/2021 | Obayashi |
| 2021/0089841 A1* | 3/2021 | Mithun .................. G06V 20/52 |
| 2022/0215201 A1* | 7/2022 | Dwivedi .............. G06V 10/764 |

FOREIGN PATENT DOCUMENTS

| | | |
|---|---|---|
| JP | 2015176281 A | 10/2015 |
| JP | 2016516245 A | 6/2016 |
| JP | 2020020744 A | 2/2020 |
| JP | 2021064120 A | 4/2021 |

OTHER PUBLICATIONS

International Search Report with English Translation, PCT/JP2022/025146, Sep. 13, 2022 (4 pgs.).
International Preliminary Report on Patentability, PCT/JP2022/025146, Aug. 8, 2023.

\* cited by examiner

[FIG. 1]
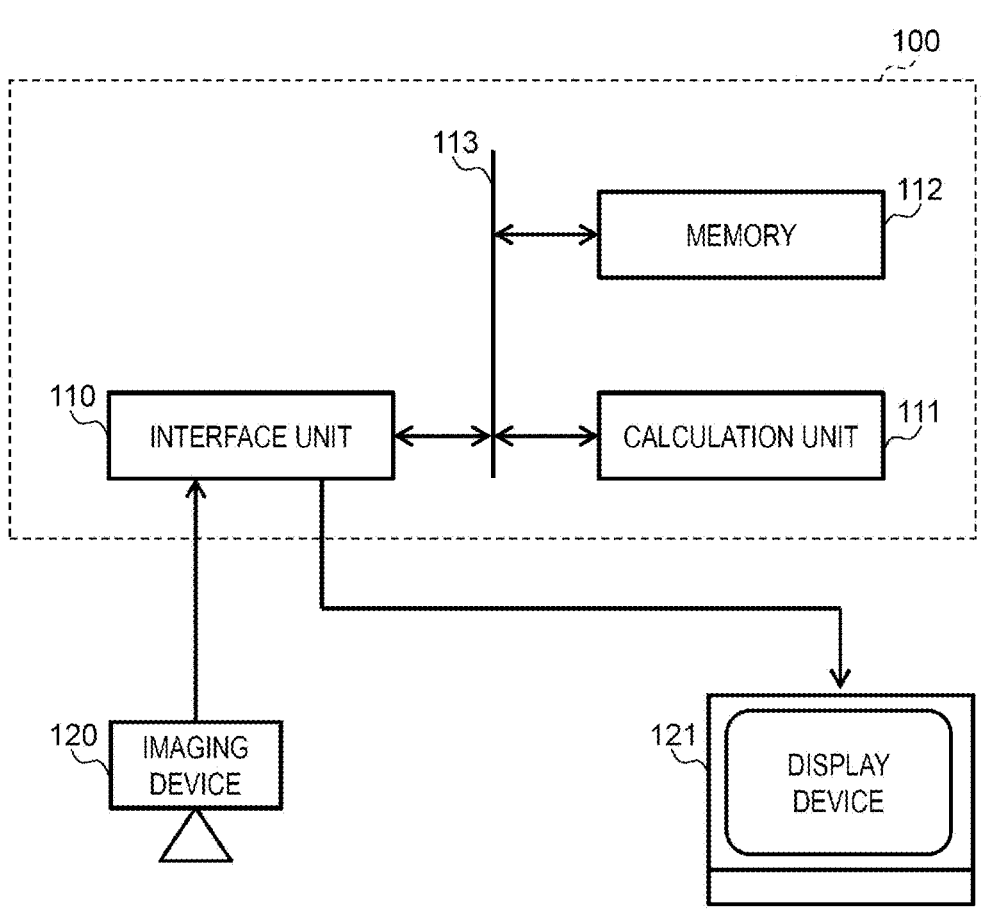

[FIG. 2]
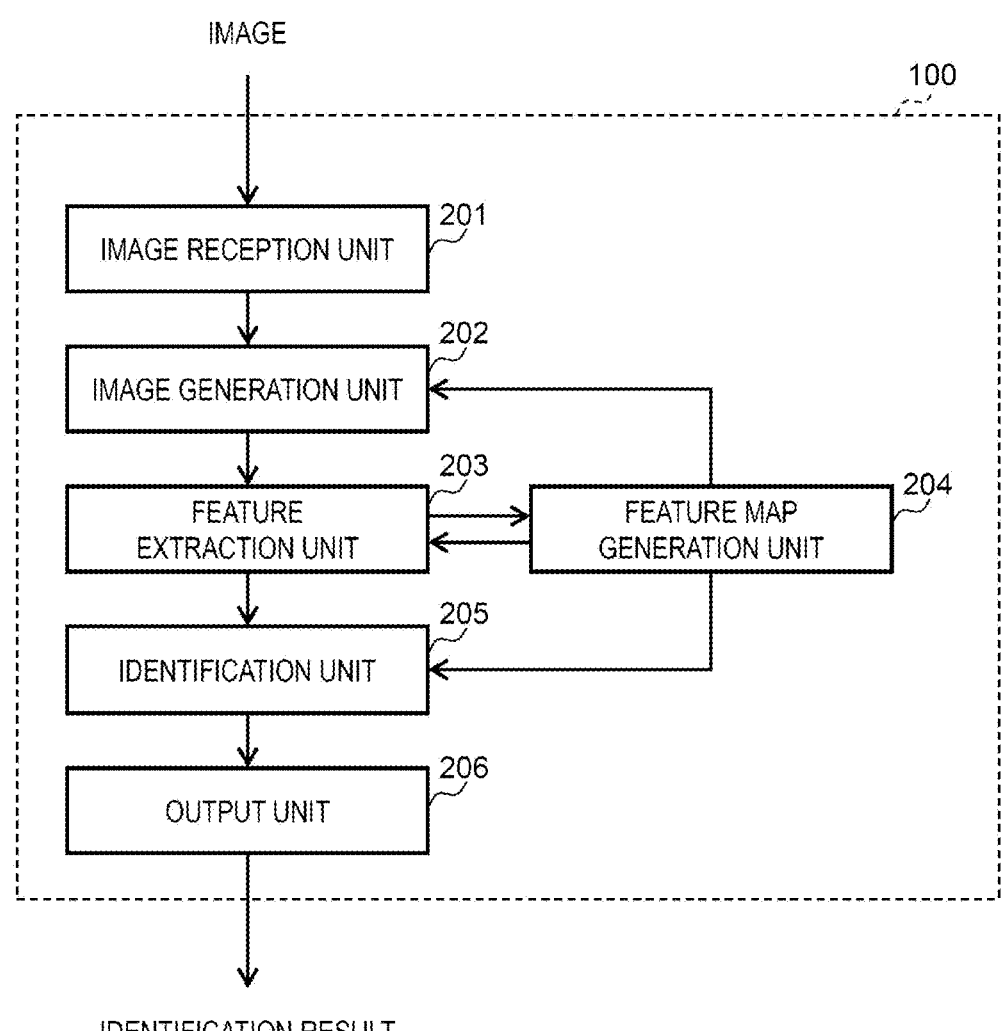

[FIG. 3]
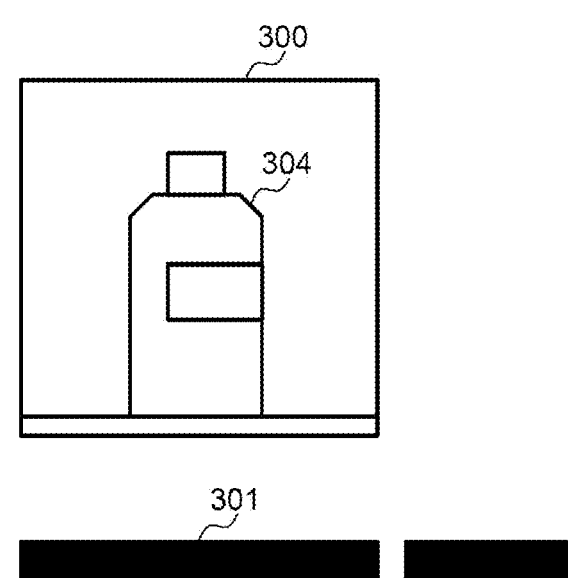
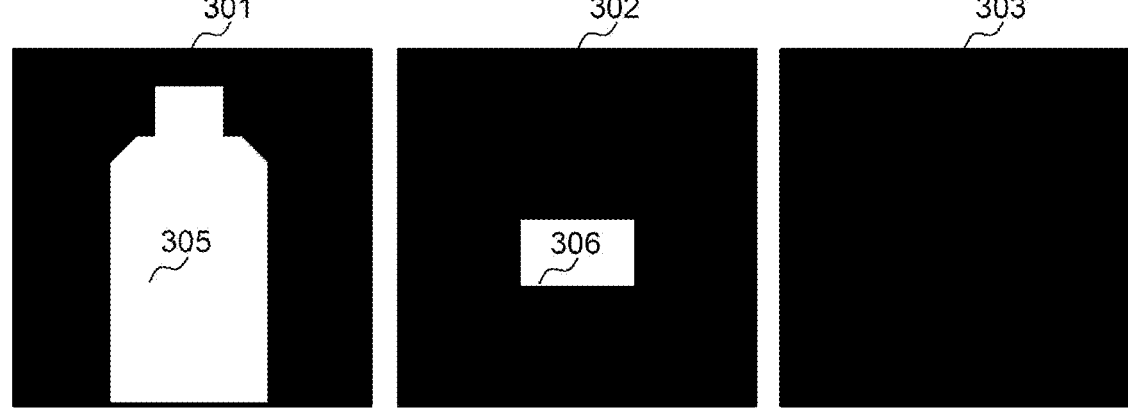

[FIG. 4]
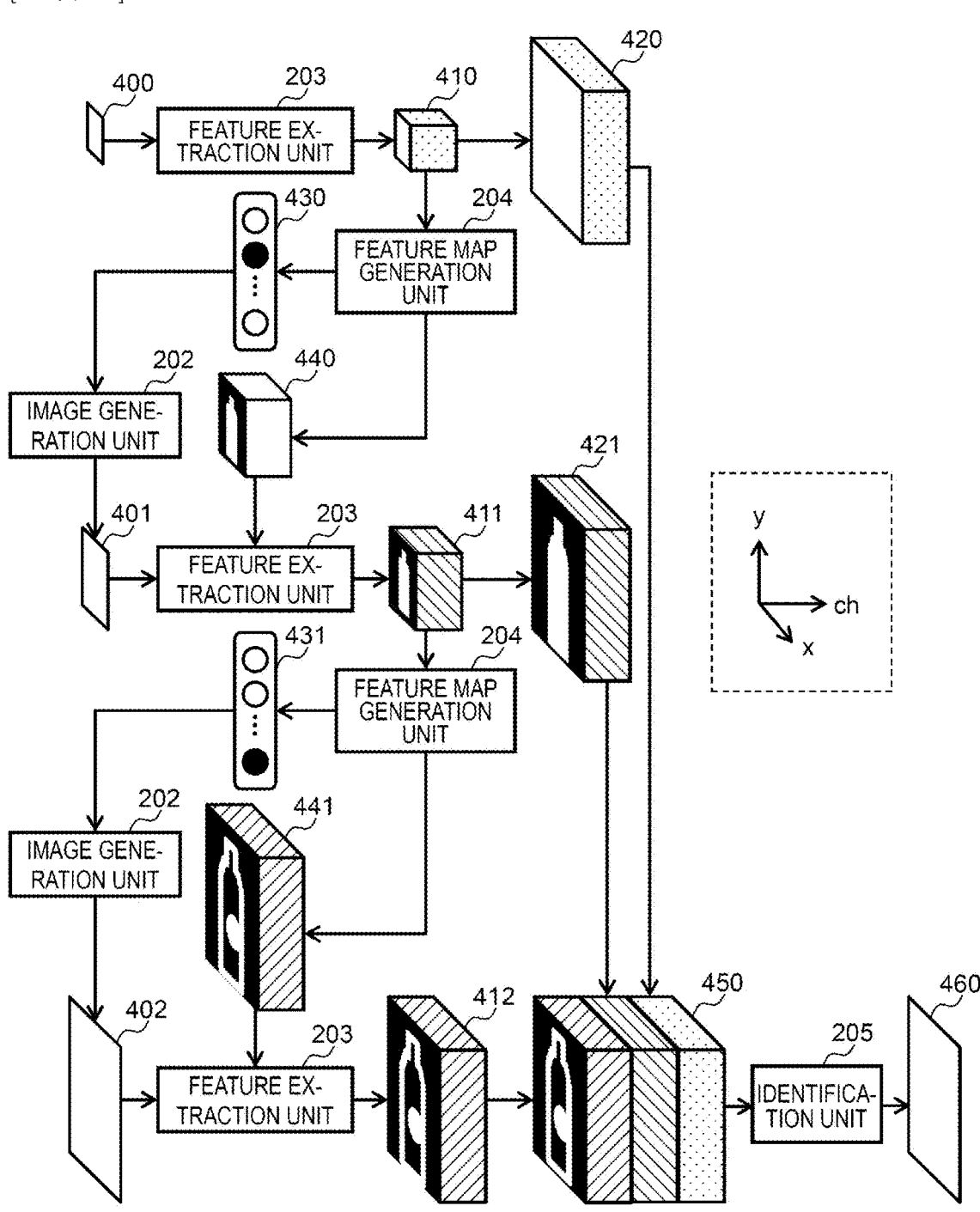

[FIG. 5]
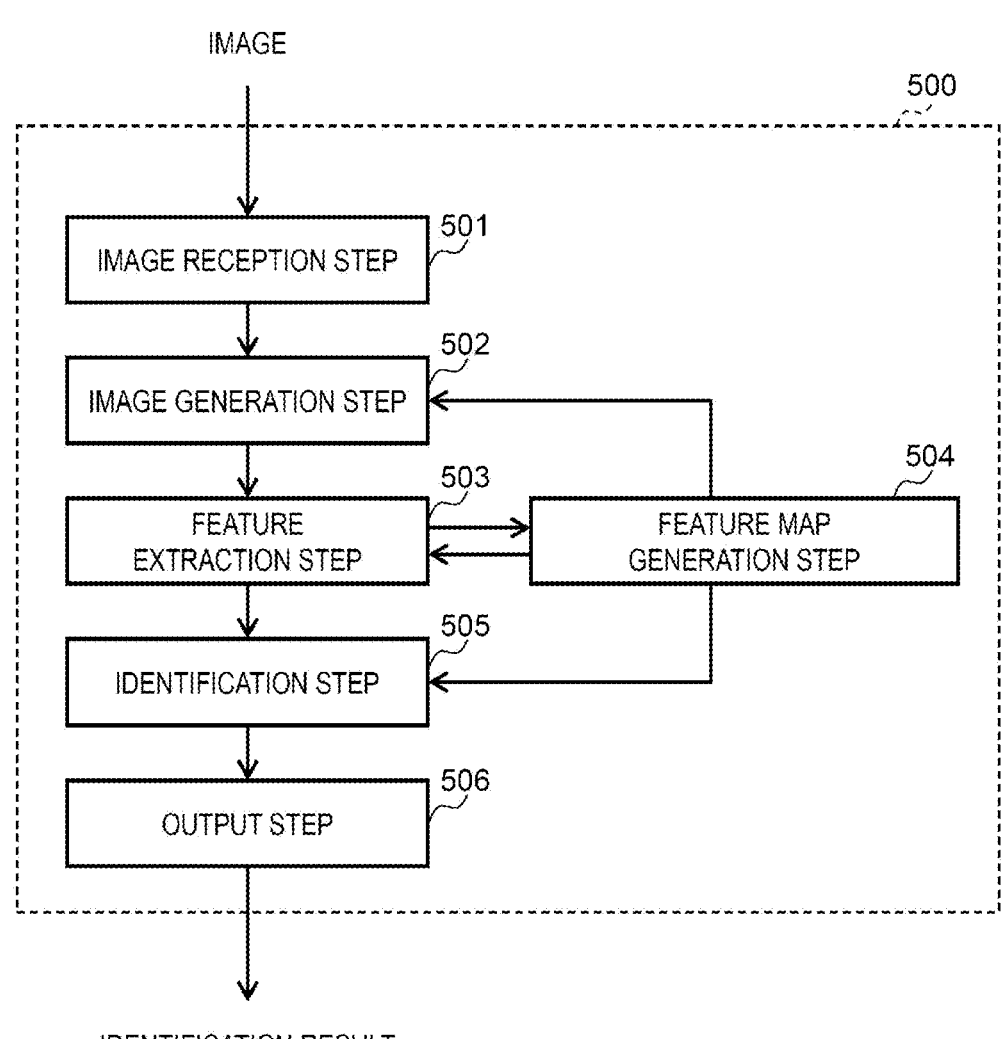

[FIG. 6]
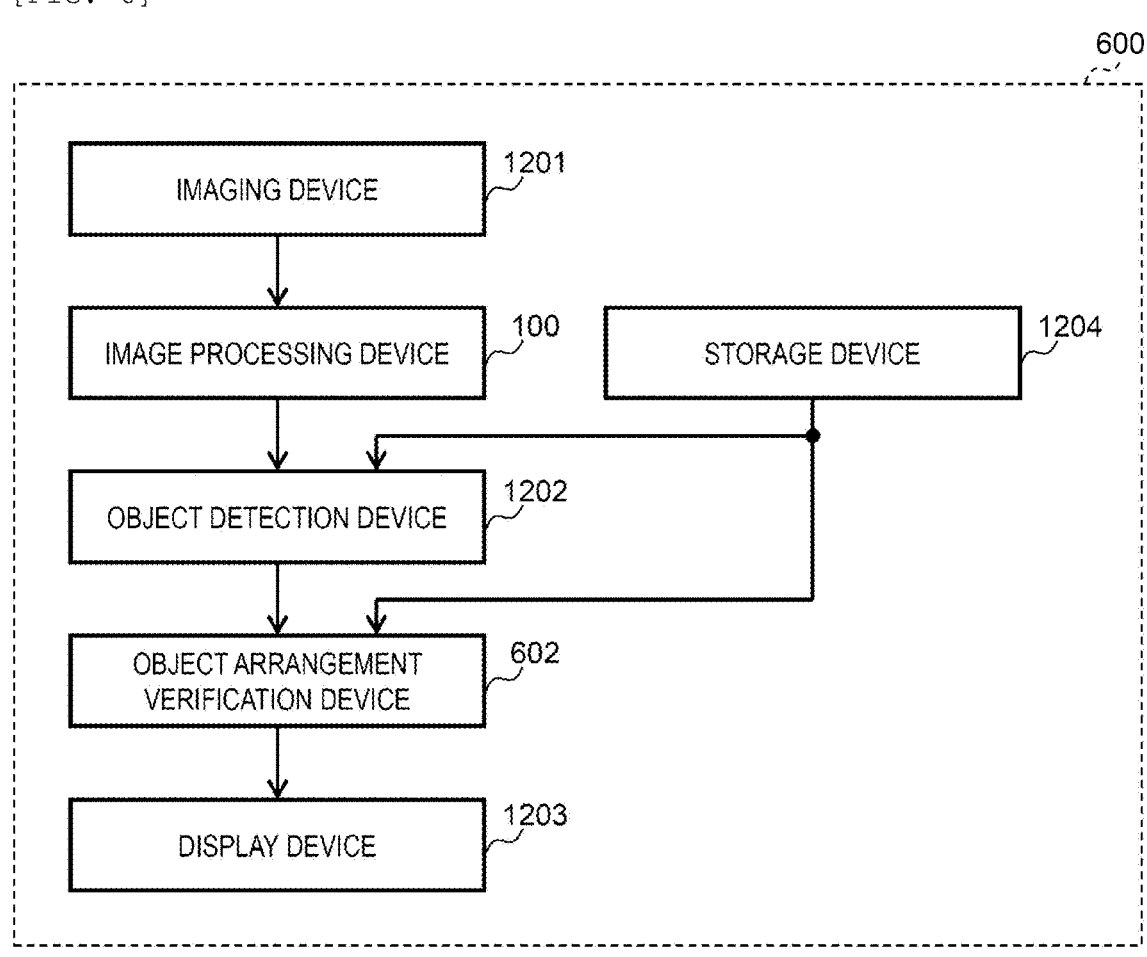

[FIG. 7]
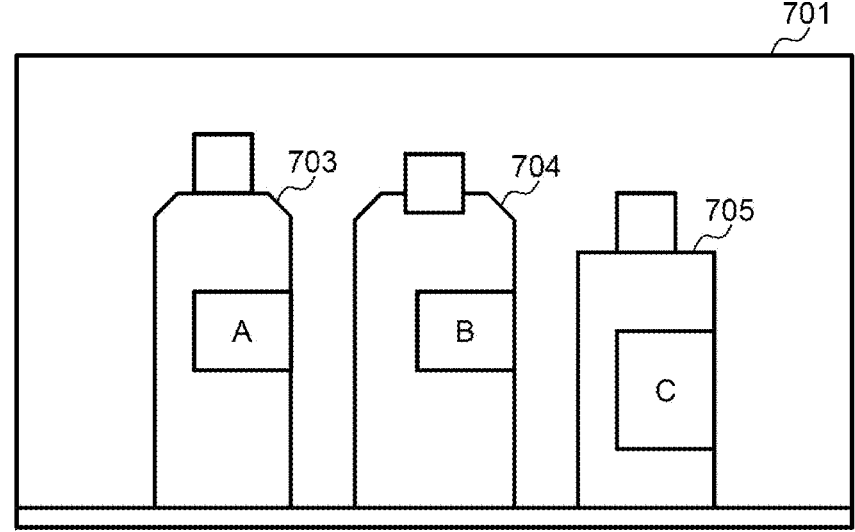
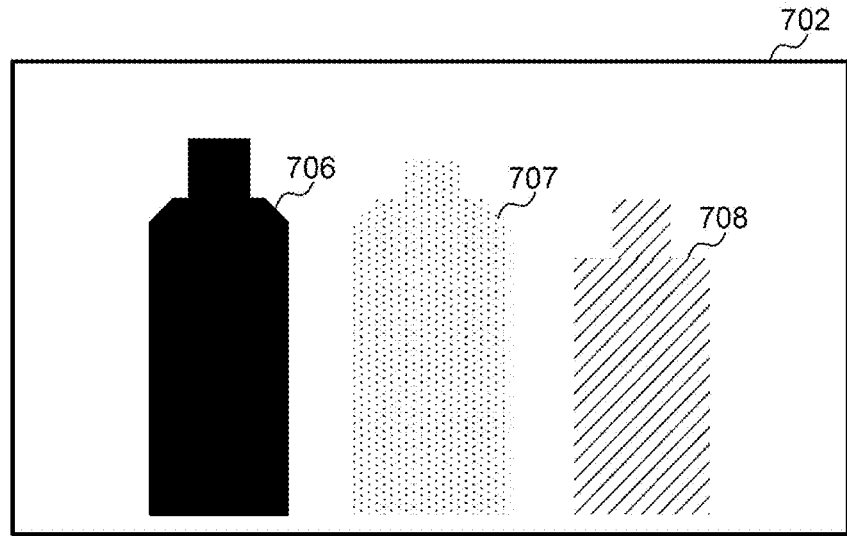

[FIG. 8A]
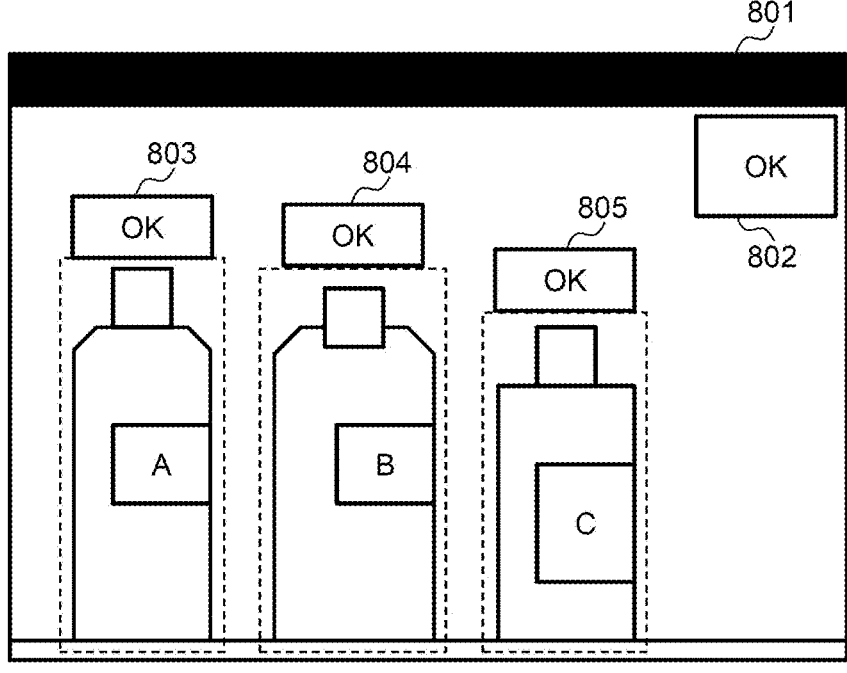
[FIG. 8B]
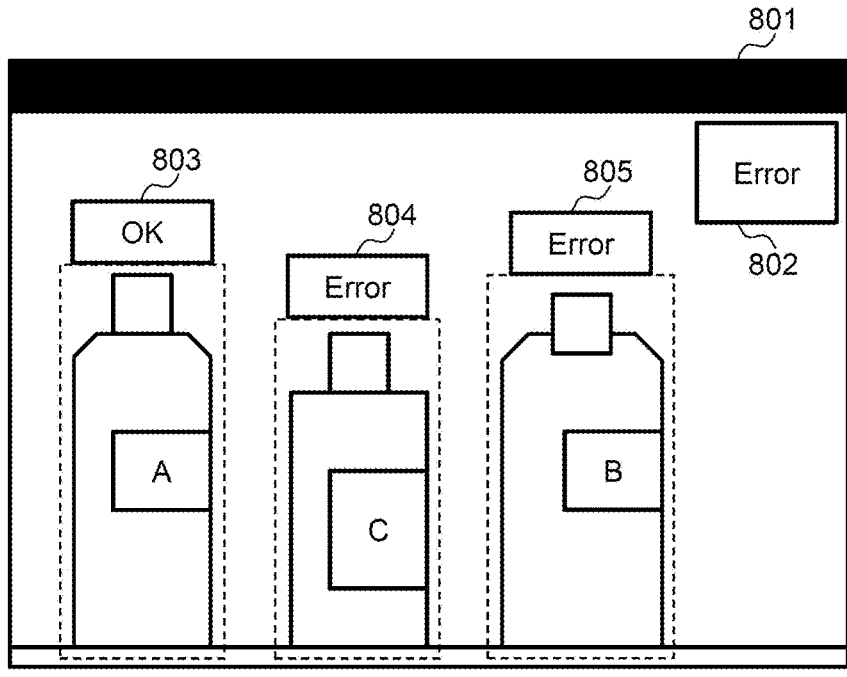

[FIG. 8C]
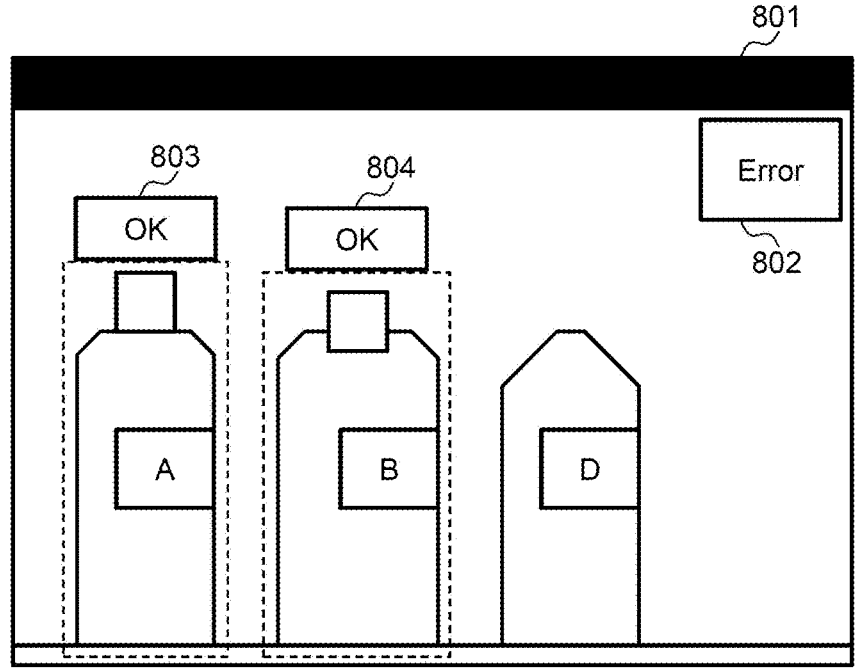

[FIG. 9]
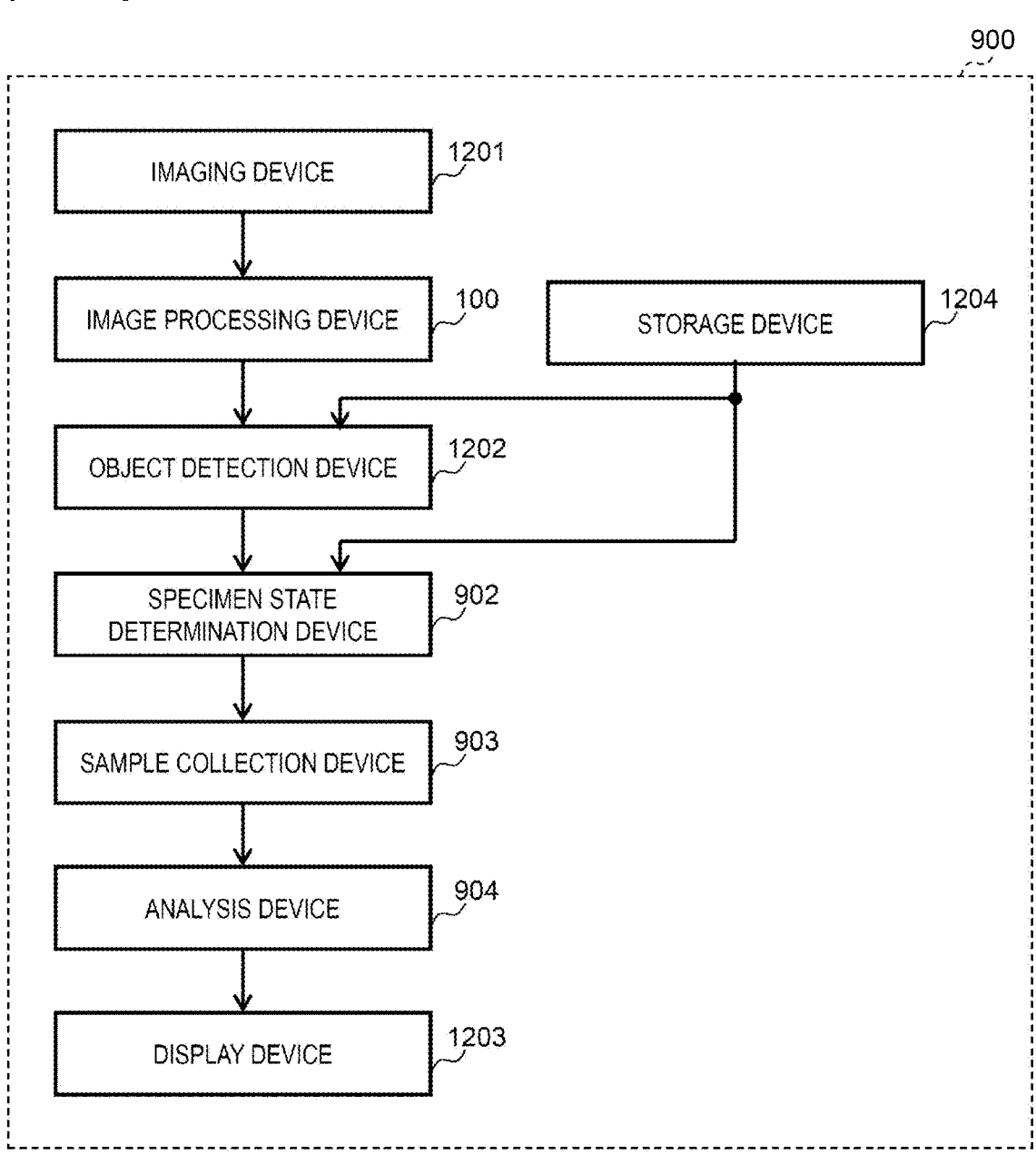

[FIG. 10A]
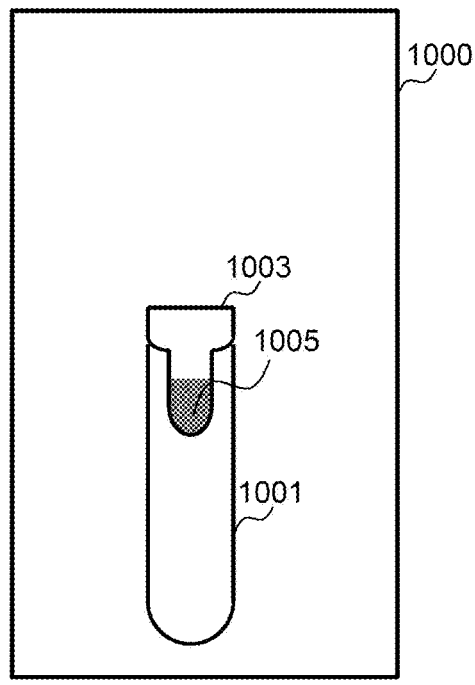
[FIG. 10B]
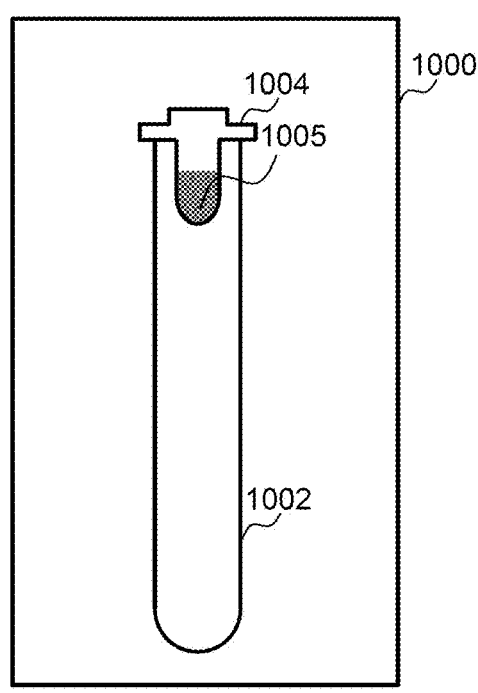

[FIG. 11]
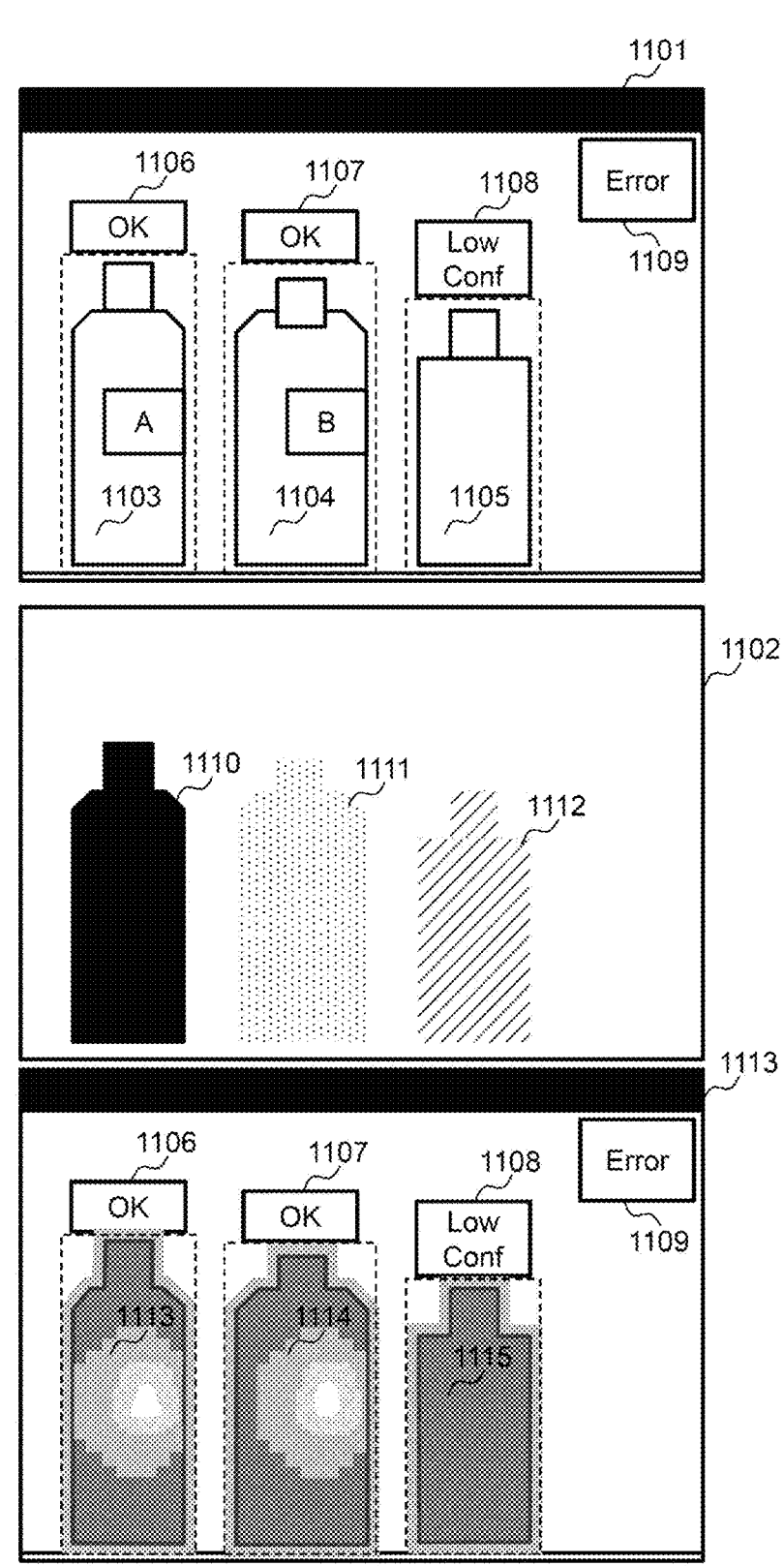

[FIG. 12]
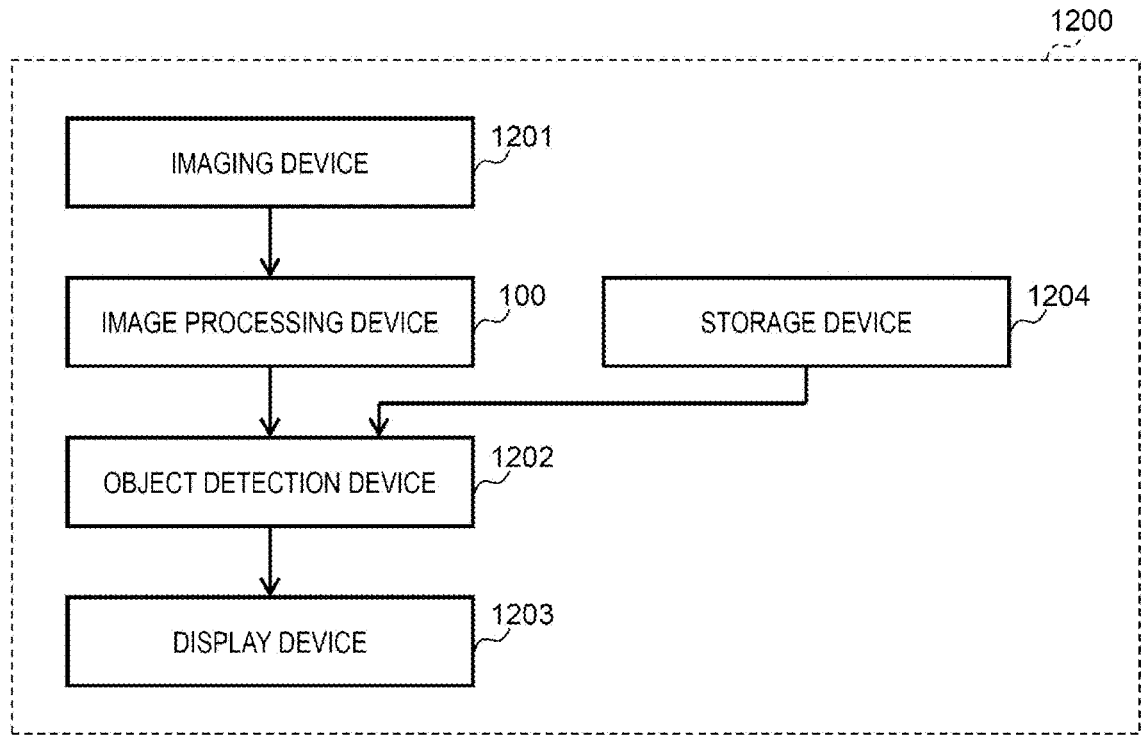

[FIG. 13A]
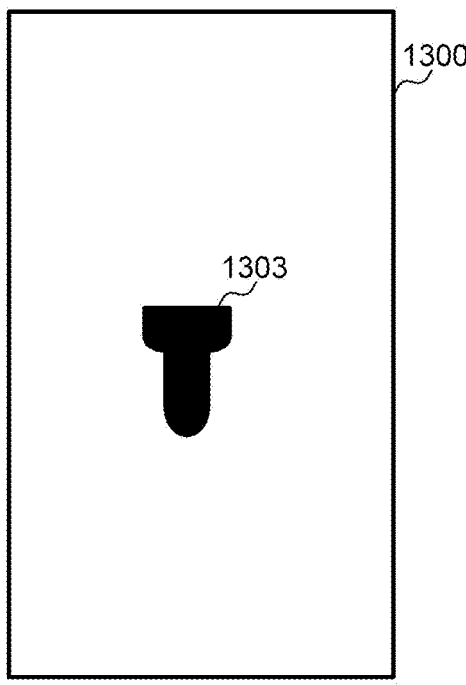
[FIG. 13B]
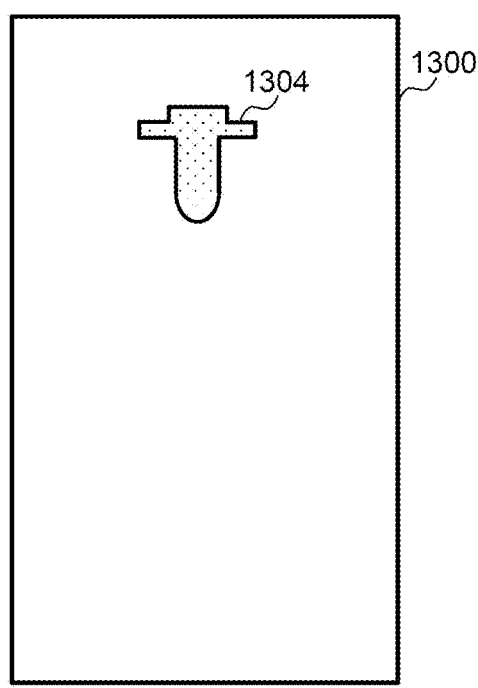

| | CUP A | CUP B | CUP C |
|---|---|---|---|
| 100 pixel | CONTAINER a | CONTAINER b | CONTAINER c |
| 75 pixel | CONTAINER d | CONTAINER e | CONTAINER f |

[FIG. 15]
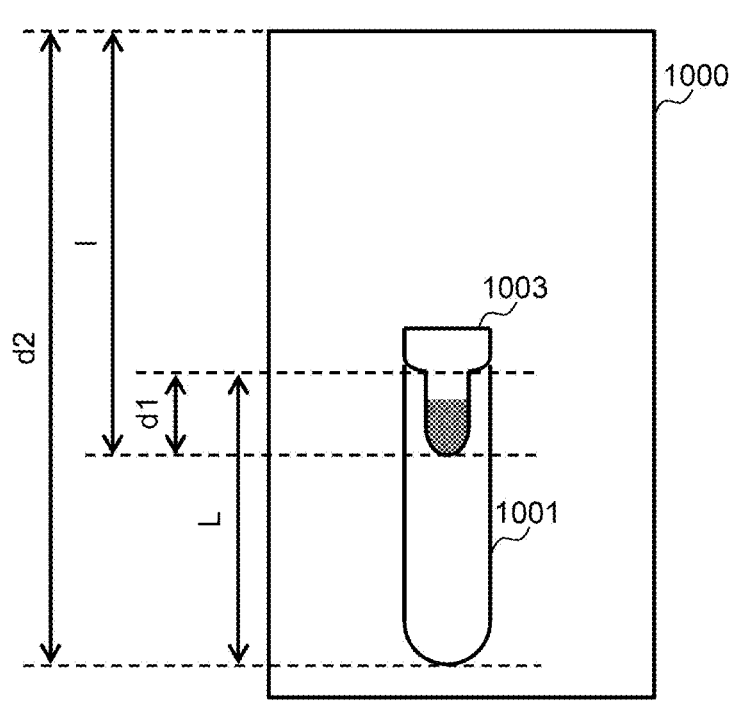

IMAGE PROCESSING DEVICE AND METHOD, AND IMAGE PROCESSING SYSTEM

TECHNICAL FIELD

The present invention relates to an image processing device and method, and an image processing system for identifying an object in an image.

BACKGROUND ART

In recent years, segmentation or identification using machine learning such as deep learning is frequently used in order to analyze an image captured by a camera or a microscope. Although the identification using machine learning can achieve high identification accuracy, there is a problem that a processing cost is generally higher than that of identification using manually designed features. When execution is required in a device having a low real-time property or a low calculation capability, it is necessary to reduce a calculation amount. For example, PTL 1 discloses that "segmentation is executed on a low resolution image, and segmentation is executed on a high resolution image using a region near a boundary in a processing result of the segmentation as a processing target region".

CITATION LIST

Patent Literature

PTL 1: JP2015-176281A

SUMMARY OF INVENTION

Technical Problem

The technique disclosed in PTL 1 is a method for increasing accuracy of the boundary in a segmentation result for the low resolution image using features extracted from the high resolution image, and thus it is necessary to properly segment regions into classes according to a stage of the low resolution image. However, in many cases, a high resolution image is necessary in order to properly segment an input image into regions or identify the regions into specific classes. For example, in analysis of cells or bacteria using a microscopic image, it is difficult to properly estimate a state of each cell or bacterium using a low resolution image alone. In addition, in inspection for a semi-conductor using a microscopic image, there may be an abnormality that cannot be determined using a low resolution image alone. In inspection using a visible light image, for example, a class of the entire region may be determined based on presence or absence of locally existing characters or patterns. In these cases, it is difficult to properly segment regions into classes using the low resolution image alone, and it is possible to specify the class only by using features of the high resolution image.

Therefore, an object of the invention is to provide an image processing device, method, and system that execute segmentation or identification processing with high accuracy and at a high speed by extracting a minimum feature necessary for identification at a high speed.

Solution to Problem

In order to achieve the above object, an image processing device disclosed in the invention is an image processing device for identifying an object in an image, and includes: an image reception unit configured to receive an input image; an image generation unit configured to generate an image for extracting a feature from the input image; a feature extraction unit configured to extract a feature from the generation image generated by the image generation unit; an identification unit configured to identify an object in the image using the feature output from the feature extraction unit; an output unit configured to output an identification result output from the identification unit; and a feature map generation unit configured to instruct the image generation unit to generate a new generation image as necessary based on the feature output from the feature extraction unit, and to generate a feature map indicating a feature extraction condition for the new generation image and output the generated feature map to the feature extraction unit.

An image processing method disclosed in the invention is an image processing method for identifying an object in an image, and includes: an image reception step of receiving an input image; an image generation step of generating an image for extracting a feature from the input image; a feature extraction step of extracting a feature from the generation image generated in the image generation step; an identification step of detecting or identifying an object in the image using the feature extracted in the feature extraction step; an output step of outputting an identification result outputted in the identification step; and a feature map generation step of generating, in the image generation step, a new generation image as necessary based on the feature output in the feature extraction step and generating a feature map indicating a feature extraction condition for the new generation image in the feature extraction step.

Advantageous Effects of Invention

According to the invention, it is possible to provide a device, a method, and a system for identifying a target object in an image with high accuracy and at a high speed.

BRIEF DESCRIPTION OF DRAWINGS

FIG. 1 is a diagram showing an example of a hardware configuration of an image processing device according to Embodiment 1.

FIG. 2 is a diagram showing an example of a functional block diagram of the image processing device according to Embodiment 1.

FIG. 3 is a diagram showing an example of a feature extraction map.

FIG. 4 is a diagram showing an example of pixel unit identification processing.

FIG. 5 is a diagram showing an example of a processing flow of an image processing method according to Embodiment 1.

FIG. 6 is a diagram showing an example of a hardware configuration of an image processing system according to Embodiment 3.

FIG. 7 is a diagram showing an example of input and output to and from the image processing device in object arrangement determination.

FIG. 8A is a diagram showing a display example of an object arrangement verification result.

FIG. 8B is a diagram showing a display example of the object arrangement verification result.

FIG. 8C is a diagram showing a display example of the object arrangement verification result.

FIG. 9 is a diagram showing an example of a hardware configuration of an image processing system according to Embodiment 4.

FIG. 10A is a diagram showing an example of an input image to an image processing device 100 according to Embodiment 4.

FIG. 10B is a diagram showing an example of the input image to the image processing device 100 according to Embodiment 4.

FIG. 11 is a diagram showing a display example of the object arrangement verification result using a confidence factor.

FIG. 12 is a diagram showing an example of a hardware configuration of an image processing system according to Embodiment 2.

FIG. 13A is a diagram showing an example of a segmentation result according to Embodiment 4.

FIG. 13B is a diagram showing an example of the segmentation result according to Embodiment 4.

FIG. 14 is a diagram showing an example of a correspondence table of a cup type, a false bottom container, and a container type.

FIG. 15 is a diagram showing an example of a method for calculating a length of the false bottom container.

DESCRIPTION OF EMBODIMENTS

Hereinafter, embodiments of an image processing device, method, and system according to the invention will be described with reference to the accompanying drawings. In the following description and the accompanying drawings, components having the same functional configuration are denoted by the same reference numerals, and redundant description thereof will be omitted.

Embodiment 1

<Hardware Configuration of Image Processing Device>

A hardware configuration of an image processing device according to Embodiment 1 will be described with reference to FIG. 1. An image processing device 100 includes an interface unit 110, a calculation unit 111, a memory 112, and a bus 113, and the interface unit 110, the calculation unit 111, and the memory 112 transmit and receive information via the bus 113.

Each unit of the image processing device 100 will be described.

The interface unit 110 is a communication device that transmits signals to and receives signals from a device outside the image processing device 100. The device that communicates with the interface unit 110 includes an imaging device 120 such as a camera or a microscope, and a display device 121 such as a monitor or a printer.

The calculation unit 111 is a device that executes various types of processing in the image processing device 100, and is, for example, a central processing unit (CPU) or a field-programmable gate array (FPGA). Functions executed by the calculation unit 111 will be described later with reference to FIG. 2.

The memory 112 is a device that stores programs to be executed by the calculation unit 111, parameters, coefficients, processing results, and the like, and is an HDD, an SSD, a RAM, a ROM, a flash memory, or the like.

<Functional Configuration of Image Processing Device>

FIG. 2 is an example of a functional block diagram of the image processing device 100 according to Embodiment 1.

These functional units may be implemented by software operating on the calculation unit 111 or may be implemented by dedicated hardware.

The image processing device 100 includes an image reception unit 201, an image generation unit 202, a feature extraction unit 203, a feature map generation unit 204, an identification unit 205, and an output unit 206 as functional units. Hereinafter, each functional unit will be described.

The image reception unit 201 receives an input image such as a visible light image or a microscope image input from the interface unit 110.

The image generation unit 202 generates an image for extracting a feature using the input image. When receiving a generation image signal from the feature map generation unit 204 to be described later, the image generation unit 202 determines an image to be generated based on the generation image signal. When no generation image signal is received, extraction is performed on the image with a predetermined setting.

The feature extraction unit 203 extracts a feature from the image generated by the image generation unit 202. When receiving a feature extraction map from the feature map generation unit 204 to be described later, the feature extraction unit 203 extracts a feature only for a region or a feature, which have a value equal to or greater than a preset threshold among regions or feature types in the feature extraction map. When no feature extraction map is received, all types of features are extracted from the entire image, or only predetermined regions and features are extracted.

The feature map generation unit 204 generates a feature extraction map using the feature output from the feature extraction unit 203. The feature extraction map designates an image to be generated next by the image generation unit 202, and a region from which a feature is to be extracted next by the feature extraction unit 203, and a type of the feature.

The identification unit 205 executes identification processing using all or a part of the features output from the feature extraction unit 203. The identification processing includes image unit identification processing of classifying an input image into a predetermined class, pixel unit identification processing (segmentation), processing of detecting a position of an object with a rectangle, and the like. By this identification processing, it is possible to detect presence of an object and determine a type of the object.

The output unit 206 outputs an identification result output from the identification unit 205 to the outside of the device. When the identification result is in image unit, class information or likelihood information for each image may be output in a form of numerical data, or such information may be output in a form that can be visually understood such as a character string. When the identification result is in pixel unit, information on a class or likelihood of each pixel may be output in a form of numerical data, or may be output as an image in which the class is expressed by a unique color. When the identification result is rectangle information, a class or likelihood, and rectangle information of each rectangle may be output in a form of numerical data, or a rectangle and class information may be output as an image expressed by a frame line, a color, and the like on the image.

The functions described above do not need to be implemented as in the functional units in FIG. 2 as long as processing for performing an operation of each functional block can be implemented. FIG. 5 shows an example of a processing flowchart according to Embodiment 1. Steps correspond to elements respectively in the functional block diagram shown in FIG. 2.

In an image reception step 501, an input image such as a visible light image or a microscope image input from the interface unit 110 is received.

In an image generation step 502, an image for extracting a feature is generated using the input image. In the image generation step 502, when a generation image signal generated in a feature map generation step 504 to be described later is received, an image to be generated is determined based on the generation image signal. When no generation image signal is received, the image is generated with a predetermined setting.

In a feature extraction step 503, a feature is extracted from the image generated in the image generation step 502. In the feature extraction step 503, when a feature extraction map is received from the feature map generation step 504 to be described later, a feature only for a region or a feature, which have a value equal to or greater than a preset threshold is extracted among regions or feature types in the feature extraction map. When no feature extraction map is received, all types of features are extracted from the entire image, or only predetermined regions and features are extracted.

In the feature map generation step 504, a feature extraction map is generated using the feature extracted in the feature extraction step 503. The feature extraction map designates an image to be generated next in the image generation step 502, and a type of a feature and a type of a region to be extracted next in the feature extraction step 503.

In an identification step 505, identification processing is executed using all or a part of the features output in feature extraction step 503. The identification processing includes image unit identification processing of classifying an input image into a predetermined class, pixel unit identification processing (segmentation), detection processing of detecting a position of an object with a rectangle, and the like.

In an output step 506, an identification result outputted in the identification step 505 is output to the outside of the device. When the identification result is in image unit, class information or likelihood information for each image may be output in a form of numerical data, or such information may be output in a form that can be visually understood such as a character string. When the identification result is in pixel unit, information on a class or likelihood of each pixel may be output in a form of numerical data, or may be output as an image in which the class is expressed by a unique color. When the identification result is rectangle information, a class or likelihood, and rectangle information of each rectangle may be output in a form of numerical data, or a rectangle and class information may be output as an image expressed by a frame line, a color, and the like on the image.

Hereinafter, a detailed operation will be described with each functional unit as a subject, but each step corresponding to the functional unit may be read as the subject.
<Configuration and Operation of Each Unit>

Hereinafter, operations of the image generation unit 202, the feature extraction unit 203, the feature map generation unit 204, and the identification unit 205 among the functional units will be described in detail.

The image generation unit 202 generates an image for extracting a feature using an input image. The image generation unit 202 operates differently depending on whether a generation image signal is received from the feature map generation unit 204 to be described later. When the generation image signal is received, an image is generated based on the generation image signal. The generation image signal designates, for example, a reduction ratio or an image size of the image. The designated image may be, as candidates, an image having a specific frequency component using a low-pass filter, a high-pass filter, a band-pass filter, or the like, an image to which image processing such as correction, emphasis, and noise removal is applied, an image to which masking processing using a feature extraction map to be described later is applied, or the like. In addition, an image obtained by combining such image processing may be a candidate. Types of candidate images are predetermined.

When no generation image signal is received, the image generation unit 202 sets the image with a predetermined initial setting. For example, the image is generated by reducing the input image with a predetermined reduction ratio or image size. The initial setting of the generation image may represent one of the candidate images.

The feature extraction unit 203 extracts a feature from the generation image output from the image generation unit 202. The feature to be extracted may be a handcrafted feature such as HOG or Haar-Like feature, or may be automatically obtained by machine learning such as deep learning or random forest. In addition, the feature to be extracted based on the generation image signal or parameters of the feature may be changed.

When receiving a feature extraction map from the feature map generation unit 204 to be described later, the feature extraction unit 203 limits a region from which the feature is to be extracted and a type of the feature based on the feature extraction map. The feature extraction map is an array corresponding to the type of the feature and the region, and when a value in the feature extraction map is greater than a preset threshold, feature extraction is executed on the corresponding feature and region.

FIG. 3 shows an example of the feature extraction map. An image 300 is a feature extraction target image received from the image generation unit 202, and feature extraction maps 301, 302, and 303 are feature extraction maps for features A, B, and C, respectively. White regions in the feature extraction maps 301, 302, and 303 represent regions in which values in the feature extraction maps are equal to or greater than a preset threshold, and black regions represent regions in which values in the feature extraction maps are less than the threshold. A target object 304 is an object to be detected, and a bottle is exemplified here. The target object 304 includes a bottle body, a cap, and a label. The regions 305 and 306 are regions in the feature extraction maps that have values equal to or greater than the threshold.

For example, in the feature extraction map 301, since only the region 305 is equal to or greater than the threshold, the feature A is extracted only from a region in the generation image corresponding to the region 305. That is, the feature A is applied only to a region around the bottle, and is not applied to a background or floor region. In the feature extraction map 302, since only the region 306 is equal to or greater than the threshold, the feature B is extracted only from a region in the generation image corresponding to the region 306. That is, the feature B is applied only to a label region, and is not applied to other regions. Since all regions in the feature extraction map 303 are less than the threshold, feature extraction processing is not executed. Since the feature extraction map is determined based on the feature extracted from the previous generation image, the region to be validated changes depending on the feature.

A feature map common to all features may be designated as the feature extraction map. That is, it is a map showing only a region for feature extraction. For example, when the feature extraction map 301 in FIG. 3 is received as the feature map common to all features, the features A, B, and C are extracted for the region 305, and feature extraction is not executed on other regions.

The feature extraction map may designate only the feature to be extracted without designating the region for extraction. For example, the feature extraction map may have three arrays corresponding to the features A, B, and C, and as a result of feature map calculation, only the feature that is equal to or greater than the threshold may be extracted, and other features may not be extracted.

In this way, the feature extraction unit 203 reduces the feature extraction processing by limiting the region from which the feature is to be extracted and the type of the feature based on the feature extraction map, and implements high-speed identification processing in the identification unit 205.

The feature map generation unit 204 generates a generation image signal that designates the type of the image generated by the image generation unit 202, and a feature extraction map that is used to limit the region from which the feature is to be extracted by the feature extraction unit 203 and the type of the feature.

A method for generating the generation image signal will be described. The generation image signal determines an image to be generated next by the image generation unit 202 based on a feature output from the feature extraction unit 203. For example, the feature extraction unit 203 calculates amounts of frequency components included in the generation image as the feature, and determines the image to be generated based on a distribution of the frequency components. Alternatively, it may be determined by machine learning or the like. For example, a deep learning network is designed in which N candidates of the image to be generated next are prepared, the feature output from the feature extraction unit 203 is received, and the number of output units is N. By learning to select a generation image for which a feature effective for identification is to be extracted based on the received feature, a selector that selects the next generation image can be generated.

Next, a method for generating the feature extraction map will be described. For example, there is a method in which temporary identification is executed using features extracted so far, and a feature extraction map is generated based on a confidence factor of identification. That is, new feature extraction is not executed for a region identified with a high confidence factor using only the features extracted so far, and new feature extraction is executed for a region with a low confidence factor in order to improve the confidence factor. From which feature or region the feature effective for identification can be extracted may be estimated by machine learning. The method is the same as that of the generation image signal described above, and the feature type and the region are used as candidates to estimate a degree to which the feature extracted therefrom is effective for identification.

The feature map generation unit 204 outputs, to the identification unit 205, an extraction end signal indicating an end of the feature extraction processing. An end condition of the feature extraction processing is previously determined by a user, and is determined based on, for example, the confidence factor of the temporary identification, the number of generated images, the number of extracted features, and a processing time. The end condition based on the confidence factor includes a case where a confidence factor for the entire region is equal to or greater than a certain value or a case where an average of confidence factors is equal to or greater than a certain value, for example, in pixel unit identification. The end condition based on the confidence factor includes, in image unit identification, a case where a confidence factor of identification output for one image is equal to or greater than a certain value, or a case where an identification score is equal to or greater than a certain value. Upper limits may be set for the number of generated images, the number of extracted features, the processing time, and the like, and the processing may end when any of the upper limits or all of the upper limits are reached. The end may be comprehensively determined based on the number of generated images, the number of extracted features, the processing time, and the confidence factor of identification.

The identification unit 205 receives the extraction end signal output from the feature map generation unit 204, executes final identification using all or a part of the features extracted by the feature extraction unit 203, and outputs an identification result.

FIG. 4 shows an example of the pixel unit identification processing. FIG. 4 shows an example in which a plurality of reduced images are used as generation images. The generation images 400, 401, and 402 are a ¼ reduced image, a ½ reduced image, and a non-reduced image, respectively. Features 410, 411, and 412 are features extracted by the feature extraction unit 203 from the generation images 400, 401, and 402, respectively. Original image unit features 420 and 421 are features obtained by enlarging the features 410 and 411 by four times and twice, respectively. Generation image signals 430 and 431 are generation image signals output from the feature map generation unit 204. Feature extraction maps 440 and 441 are feature extraction maps output from the feature map generation unit 204. A combined feature 450 is a feature obtained by combining the feature 412 and the original image unit features 420 and 421. An identification result 460 is an example of a pixel unit identification result obtained by inputting the combined feature 450 to the identification unit 205. Here, the generation images 400, 401, and 402 have dimensions of a vertical direction y, a horizontal direction x, and a channel ch. The features 410, 411, and 412, the original image unit features 420 and 421, the feature extraction maps 440 and 441, and the combined feature 450 have dimensions of the vertical direction y, the horizontal direction x, and a feature type ch. The identification result 460 has dimensions of the vertical direction y, the horizontal direction x, and a class ch.

In the example in FIG. 4, first, the feature extraction unit 203 receives the generation image 400 and outputs the feature 410. The generation image 400 is an image that the image generation unit 202 generates based on an input image when no generation image signal is received, and in the example in FIG. 4, a ¼ reduced image is generated. Next, the feature map generation unit 204 receives the feature 410 and outputs the generation image signal 430 and the feature extraction map 440. As described above, the generation image signal 430 is a signal for determining an image to be generated next, which is output from the feature map generation unit 204 to the image generation unit 202. In the example in FIG. 4, an image reduction ratio is selected as the generation image signal. In the generation image signals 430 and 431, circles represent selectable image reduction ratios, and black circles represent image reduction ratios selected by the feature map generation unit 204. A reduction ratio of ½ is selected in the generation image signal 430, and the image generation unit 202 outputs the generation image 401 (½ reduced image) based on the generation image signal 430. The feature extraction map 440 indicates a region from which the feature extraction unit 203 should extract a feature from the generation image 401. In the example in FIG. 4, the feature is extracted only from a region shown in white in the feature extraction map 440. The feature extraction unit 203 receives the generation image 401 and the feature extraction map 440, and outputs the feature 411. The feature 411 is extracted only from the white region in the feature extraction map 440, and is not extracted from other regions. A predetermined value such as 0 is stored in a region other than a feature extraction target in the feature 411.

Similarly, the feature map generation unit 204 receives the feature 411 and outputs the generation image signal 431 and the feature extraction map 441. The image generation unit 202 outputs the generation image 402 (non-reduced image) based on the generation image signal 431. The feature extraction map 441 indicates a region from which the feature extraction unit 203 should extract a feature from the generation image 402. The feature extraction unit 203 receives the generation image 402 and the feature extraction map 441, and outputs the feature 412. The feature 412 is extracted only from a region shown in white in the feature extraction map 441, and is not extracted from other regions.

Since the features 410 and 411 are reduced at the same ratio as the generation image from which the feature is extracted, the features 410 and 411 cannot be assigned directly as features for pixels. Therefore, for example, as the original image unit features 420 and 421, the features 410 and 411 are converted into a form that can be assigned to the pixels of the original image. For example, in the example in FIG. 4, the features 410 and 411 are enlarged four times and twice. Thereafter, by combining all the features as in the combined feature 450, an overall feature corresponding to the pixels can be obtained. Finally, the identification unit 205 receives the combined feature 450 and outputs the identification result 460. The identification result 460 represents class information for each pixel.

A method for creating the original image unit features 420 and 421 described above is an example, and other methods may be used as long as the features can be assigned to the pixels in the original image. For example, a feature may be assigned to the original image in a stepwise manner, such as combining a feature obtained by enlarging the feature 410 twice with the feature 411, generating a new feature based on the combined feature, and then enlarging the combined feature twice.

In a case of the image unit identification, a step of assigning the features to the pixels may be omitted, and the identification may be executed using all the obtained features, or the identification may be executed using the feature further thinned out by a method for taking a maximum value for each region, for example.

The output unit 206 outputs an identification result output from the identification unit 205 to the outside of the device. An array or a numerical value of the identification result may be directly output, and in a case of segmentation, an image in which pixels are colored according to the identification result may be output. In the case of the image unit identification, the identification result may be output in a form that is easily understood by the user such as a character string.

As described above, it is possible to provide a device and a method for detecting or identifying a target object in an image with high accuracy and at a high speed.

Embodiment 2

Embodiment 2 relates to an image processing system for detecting an object at a high speed based on a segmentation result or an identification result output from the image processing device described in Embodiment 1 and a detection-related designation signal for designating a setting or information related to detection.

FIG. 12 shows a hardware configuration diagram according to Embodiment 2. An image processing system 1200 according to Embodiment 2 includes an imaging device 1201, the image processing device 100, an object detection device 1202, a display device 1203, and a storage device 1204.

The imaging device 1201 is a device that images a target object, and is, for example, a camera.

The image processing device 100 is the image processing device described in Embodiment 1, and calculates segmentation of a specific object region, an identification result, or both of the segmentation and the identification result based on an image captured by the imaging device 1201.

The object detection device 1202 outputs detection information on the object based on a segmentation result or an identification result output from the image processing device 100, and a detection target designation signal that is a signal for designating a detection target among detection-related designation signals output from the storage device 1204.

The display device 1203 presents, to a user, an object detection result by the object detection device 1202.

The storage device 1204 stores the detection-related designation signals preset by the user. The detection-related designation signals are signals for designating various settings and information related to detection. The detection-related designation signals according to Embodiment 2 include a detection target designation signal for designating a detection target in the object detection device 1202. The storage device 1204 outputs the detection target designation signal to the object detection device 1202. Although not particularly shown in FIG. 12, the image processing system 1200 may include a user interface device such as a keyboard, and may allow the user to rewrite the detection-related designation signals recorded in the storage device 1204 during a system operation.

<Operation of Each Device>

Operations of the imaging device 1201, the display device 1203, and the storage device 1204 are as described above. The operation of the image processing device 100 is as described in Embodiment 1. Therefore, the object detection device 1202 will be described here.

A case where the image processing device 100 outputs a segmentation result will be described. FIG. 7 shows an example of an image captured by the imaging device 1201 and a segmentation result output from the image processing device 100. An image 701 is an example of a captured image of a plurality of reagent bottles, and a segmentation result 702 is an example of a result of segmentation of the image 701 by the image processing device 100. Bottles 703, 704, and 705 are bottles of reagents A, B, and C, respectively, and bottle regions 706, 707, and 708 are bottle regions of chemicals A, B, and C obtained by segmentation. The bottle regions 706, 707, and 708 are segmented into different classes, and a difference in texture represents a difference in class.

The segmentation result 702 is effective for the user to visually check a situation. However, when the user requires object unit information (for example, information indicating presence or absence of a specific type of bottle, the number of bottles in the image, and an order in which the bottles are arranged), different processing is necessary. Therefore, the object detection device 1202 receives the detection target designation signal from the storage device 1204, extracts object information based on the detection target designation signal, and outputs the object information as a detection result.

The object detection device 1202 can output, as the detection result, information determined by the presence or absence, the number, coordinate information, arrangement information, or a combination thereof of an object belonging to each class, and designates which information is output according to the detection target designation signal. Hereinafter, a method for extracting each piece of information will be described.

First, a method for detecting presence or absence of an object belonging to each class by the object detection device 1202 will be described. The presence or absence of the object belonging to each class can be detected by extracting a combined region in the segmentation result and determining whether a combined region belonging to each class is present. At this time, since there is a possibility that the segmentation result includes an erroneously identified region, the combined region may be extracted after excluding the erroneously identified region based on a state of the combined region. An example of a method for excluding the erroneously identified region includes a method in which a threshold for a size of a combined region is preset, and when the number of pixels of the combined region is less than the threshold, the region is determined to be the erroneously identified region and is excluded. This is an excluding method using a fact that the size of the combined region that is the erroneously identified region tends to be smaller than a size of the combined region that is a groundtruth region. In addition, the erroneously identified region may be excluded using geometric transformation (contraction and expansion processing or the like) of an image or noise removal processing such as a median filter, or may be excluded by a method for executing threshold processing on a quantitative value calculated based on a confidence factor of an identification result in each pixel or a combined region.

The object detection device 1202 can extract a combined region belonging to each class in the segmentation result by the above-described method and count the number of combined regions of each class, thereby calculating the number of objects belonging to each class.

The object detection device 1202 can extract a combined region of each class by the above-described method and calculate a representative point (for example, an upper end, a lower end, a left end, a right end, or a center of gravity) of the combined region, thereby outputting a coordinate position of the representative point as a detection result.

The object detection device 1202 can output an arrangement position of each combined region in the segmentation result as the detection result. For example, coordinate information on the representative point is extracted from each combined region in the segmentation result by the above-described method, and is recorded in association with class information on each combined region. Thereafter, by sorting based on the coordinate information in a horizontal direction (or a vertical direction) and extracting the class information from a sorting result, an arrangement order of objects in the image in the horizontal direction (or the vertical direction) can be obtained as the arrangement information. Alternatively, the image may be segmented into grids, and presence or absence of an object in each class in each grid may be determined based on an exclusive area of the combined area in the grid, thereby obtaining grid-shaped object arrangement information.

The presence or absence, the number, the coordinate information, and the arrangement information on an object belonging to each class may be combined to detect a comprehensive state of one or more objects.

As described above, it is possible to provide the image processing system for detecting the target object in the image at a high speed.

Embodiment 3

Embodiment 3 is an image processing system for determining whether arrangement of a target object has a predetermined positional relationship using the image processing system described in Embodiment 2.

FIG. 6 shows a hardware configuration diagram according to Embodiment 3. An image processing system 600 according to Embodiment 3 includes the imaging device 1201, the image processing device 100, the object detection device 1202, an object arrangement verification device 602, the display device 1203, and the storage device 1204.

Since the imaging device 1201, the image processing device 100, the object detection device 1202, and the display device 1203 are the same as those described in Embodiment 2, description thereof will be omitted. As described in Embodiment 2, the object detection device 1202 receives, from the storage device 1204, a detection target designation signal for designating a detection target. In the present embodiment, arrangement information on each combined region in a segmentation result is designated as the detection target designation signal. The object detection device 1202 extracts the arrangement information on objects by the method described in Embodiment 2.

<Operation of Each Device>

An operation of the storage device 1204 will be described. In the present embodiment, detection-related designation signals stored in the storage device 1204 include two signals: a detection target designation signal for designating a detection target and a proper arrangement state designation signal representing a proper arrangement state of a target object. The storage device 1204 outputs the detection target designation signal to the object detection device 1202 and outputs the proper arrangement state designation signal to the object arrangement verification device 602. The detection target designation signal and the proper arrangement state designation signal are preset by a user.

An operation of the object arrangement verification device 602 will be described.

The object arrangement verification device 602 receives the arrangement information on the objects output from the object detection device 1202 and the proper arrangement state designation signal output from the storage device 1204, and verifies whether an object in an image captured by the imaging device 1201 is properly arranged based on whether the both match.

An example of arrangement verification of bottles will be described with reference to FIG. 7. Here, an example of determining an arrangement order of the bottles in the horizontal direction will be described. First, types of reagents in a proper arrangement state are registered in order from the left as a proper arrangement state designation signal (for example, "ABC"). According to the method described in Embodiment 2, the object detection device 1202 acquires horizontal arrangement information on each object region from the segmentation result 702. As a result, in the example of the segmentation result 702, label arrangement information can be calculated as "ABC", and can be compared with proper arrangement of the bottles registered by the user, thereby determining that all the bottles are properly arranged.

The object arrangement verification device 602 creates an image for presenting to the user a result of determining whether the arrangement is proper or improper. FIGS. 8A, 8B, and 8C show display examples of an object arrangement verification result. A window 801 represents a result display window presented to the user, a comprehensive verification result 802 represents a comprehensive arrangement verification result, and individual verification results 803, 804, and 805 represent arrangement verification results of respective target objects. In the example in FIG. 8, the comprehensive verification result 802 is displayed as "OK" when all target objects are properly arranged, and is otherwise displayed as "Error".

In the example in FIG. 8A, since each bottle is properly arranged, all of the individual verification results 803, 804, and 805 and the comprehensive verification result 802 are displayed as "OK".

In the example in FIG. 8B, since arrangement of the second and third bottles from the left is improper, the individual verification results 804 and 805 are displayed as "Error", and the comprehensive verification result 802 is also displayed as "Error".

The example in FIG. 8C is an example in which the bottle at a right end cannot be properly detected since the bottle is different from an assumed bottle. Since arrangement of the left and middle bottles is proper, the individual verification results 803 and 804 are displayed as "OK". However, a calculation result of the arrangement information is "AB" and does not match the proper arrangement "ABC" of the registered bottles. Therefore, the comprehensive verification result 802 is displayed as "Error". Instead of displaying "Error", a message indicating that the number of target objects to be detected is not detected may be displayed, or the number of detected target objects may be displayed.

In FIGS. 8A, 8B, and 8C, display of "OK" and "Error" indicates whether each object is properly arranged, but for example, a type of the detected target object may also be indicated. Whether the region is properly arranged, a type of the target object, and the like may be indicated not only by text but also by colors, line types, icons, and the like of a detection frame and the region, and any display may be used as long as the display can convey arrangement information on the target object to the user. Although the arrangement from the left has been described above as an example, an upper, lower, left, right, and nested structure, or the like may be determined as long as relative arrangement of a target object can be defined. It is not necessary to display both the comprehensive verification result and the individual verification result, and either one may be displayed as necessary.

The object arrangement verification device 602 may also determine the individual verification result of each bottle by using a confidence factor of the segmentation result output from the image processing device 100. The confidence factor is a value representing a degree of confidence with which each pixel is segmented by the image processing device 100. For example, when identification scores for a background, the bottle A, the bottle B, and the bottle C are to be obtained for each pixel by segmentation, there is a method of using a maximum value of the identification scores as the confidence factor. At this time, it is desirable to execute normalization such that a value range of each identification score is from 0.0 to 1.0 and a sum of all classes of the identification scores is 1.0. For example, the object arrangement verification device 602 determines that a bottle region that cannot be detected with a sufficient confidence factor is insufficient in confidence factor or is erroneously detected, and displays the result as an individual verification result. The confidence factor may be superimposed on an object arrangement verification result screen and presented to the user.

FIG. 11 shows an example of object arrangement verification using a confidence factor. A result display window 1101 shows a result display window presented to the user, a segmentation result 1102 shows a segmentation result by the image processing device 100, and a confidence factor superimposition result 1113 shows an example in which a confidence factor of each pixel in the segmentation result output from the image processing device 100 is superimposed on the result display window 1101. The result display window 1101 includes a bottle A 1103, a bottle B 1104, and a bottle C 1105, and displays individual verification results 1106, 1107, and 1108 of the bottles and a comprehensive verification result 1109. Here, the bottle C 1105 does not have a label with a reagent name written thereon, and the reagent name cannot be visually recognized. The segmentation result 1102 indicates a segmentation result A 1110, a segmentation result B 1111, and a segmentation result C 1112 as segmentation results for the bottle A 1103, the bottle B 1104, and the bottle C 1105. The bottle A 1103, the bottle B 1104, and the bottle C 1105 are properly identified in terms of bottle type. The confidence factor superimposition result 1113 displays, as confidence factors of the segmentation result A 1110, the segmentation result B 1111, and the segmentation result C 1112, a confidence factor A 1113, a confidence factor B 1114, and a confidence factor C 1115 in a manner of being superimposed on the result display window 1101. In the confidence factor superimposition result 1113, a confidence factor for each pixel is displayed as a luminance value, and the closer to white, the higher the confidence factor, and the closer to black, the lower the confidence factor. Since the image processing device 100 extracts features from a plurality of generation images based on the feature extraction map as described in Embodiment 1, the feature extraction method is reflected in the confidence factor. Specifically, for example, the confidence factor superimposition result 1113 in FIG. 11 shows an example in which a feature is extracted from an image reduced at a plurality of ratios, and a resolution of the confidence factor is locally different. For example, since features are extracted at a high resolution for a text region in the label or a contour portion of the bottle, a confidence factor of a high resolution is obtained, but a resolution of the confidence factor decreases as a distance from the label or the contour of the bottle increases.

The image processing device 100 properly identifies bottle types of the bottle A 1103, the bottle B 1104, and the bottle C 1105 as described above, but there is a difference in the confidence factor. Here, as an example of a method for determining the individual determination result based on the confidence factor, a method will be described in which a threshold for the confidence factor is predetermined, and the individual determination result is determined based on whether a maximum confidence factor in each combined region is equal to or greater than or less than the threshold. In the confidence factor A 1113 and the confidence factor B 1114 for the bottle A 1103 and the bottle B 1104 in which the label of the bottle is visible, in particular, a confidence factor greater than the threshold is obtained around the label, and on the other hand, in the confidence factor C 1115 for the bottle C 1105 in which the label is invisible, a confidence factor equal to or greater than the threshold is not obtained. In this case, it is determined that the confidence factors for the bottle A 1103 and the bottle B 1104 are sufficient, and a bottle type obtained by the segmentation is adopted as a detection result. Since the bottle type and arrangement of the bottle A 1103 and the bottle B 1104 are proper, "OK" is displayed as the individual verification results 1106 and 1107. On the other hand, since the bottle C 1105 cannot be segmented with the confidence factor equal to or greater than the threshold, "Low Conf" indicating that the confidence factor is insufficient is displayed as the individual verification result 1108. Since the bottle C 1105 is not properly detected, the comprehensive verification result 1109 is displayed as "Error". The display content when the confidence factor is determined to be insufficient is an example, and for example, "Error" indicating erroneous arrangement may be displayed.

By verifying the arrangement only when the confidence factor is high as described above, it is possible to increase reliability of the object arrangement verification result and further reduce a risk of the erroneous arrangement of bottles. By superimposing the confidence factor on the object arrangement verification result screen or the input image to present the confidence factor to the user, the user can obtain information on which region the image processing device 100 is based on to identify the bottle type, or on insufficiency of features for identification.

As described above, it is possible to provide the image processing system for determining whether the target object in the image has the predetermined positional relationship.

Embodiment 4 is an image processing system for automatic blood analysis, having a function of determining a type of a container storing a sample to be analyzed at a high speed and with high accuracy, using the image processing system described in Embodiment 2. The blood analysis includes biochemical analysis and immunoanalysis. By automatically determining the container type input to the image processing system, it is possible to apply a specimen state determination function (for example, detection of presence or absence of air bubbles or foreign matter affecting the analysis) according to the container type, and reliability of the blood analysis is improved.

FIG. 9 shows a hardware configuration diagram according to Embodiment 4. An image processing system 900 according to Embodiment 4 includes the imaging device 1201, the image processing device 100, the object detection device 1202, a specimen state determination device 902, a sample collection device 903, an analysis device 904, the display device 1203, and the storage device 1204.

Since the imaging device 1201 and the display device 1203 are the same as the respective devices described in Embodiment 2, description thereof will be omitted. However, the imaging device 1201 images a container storing a sample (hereinafter referred to as a specimen) from the side. The image processing device 100 executes segmentation for identifying a container type, and the object detection device 1202 determines the container type based on a segmentation result and outputs the container type. Details will be described later.

<Operation of Each Device>

Hereinafter, operations of the image processing device 100, the object detection device 1202, the specimen state determination device 902, the sample collection device 903, and the analysis device 904 will be described in detail.

An operation of the storage device 1204 will be described. In the present embodiment, detection-related designation signals stored in the storage device 1204 include two signals: a detection target designation signal for designating a detection target and a sample state and/or container state determination target designation signal for designating a state determination target in the specimen state determination device 902. The storage device 1204 outputs the detection target designation signal to the object detection device 1202, and outputs the sample and/or container state determination target designation signal to the specimen state determination device 902. The detection target designation signal designates container type information determined based on presence or absence of an object belonging to each class and a coordinate position thereof. The sample and/or container state determination target designation signal designates, for example, a state of a sample and/or a container that a user wants to determine, such as presence or absence of air bubbles or foreign matter present in the sample or inclination of the container. The detection target designation signal and the sample state and/or container state determination target designation signal are preset by the user.

Operations of the image processing device 100 and the object detection device 1202 according to Embodiment 4 will be described. FIGS. 10A and 10B show examples of an input image to the image processing device 100 according to Embodiment 4. Input images 1000 in FIGS. 10A and 10B show examples of imaging a state in which a cup A 1003 and a cup B 1004 are placed on top of false bottom containers 1001 and 1002. A sample 1005 is stored in the cup A 1003 and the cup B 1004. The false bottom containers 1001 and 1002 are separated from the cup A 1003 and the cup B 1004, which may be combined in any manner. Here, an example in which a container type is determined based on a combination of a cup type and a length of the false bottom container will be described.

In order to identify the cup type, it is necessary to extract features from the vicinity of the cup A 1003 and the cup B 1004. In order to identify the length of the false bottom container, it is necessary to detect positions of an upper end, a lower end, and the like of the cup. In order to detect a cup position with high accuracy, it is necessary to input a high resolution image, but when extracting features from the entire image, there is a problem that the processing time is long. On the other hand, by using the image processing device 100 according to Embodiment 1, for example, a feature extraction map is generated based on a reduced image, and features necessary for cup type identification and cup position detection are extracted only from the vicinity of the cup A 1003 and the cup B 1004, so that a high speed can be achieved.

Here, an example in which the cup type in the input image is segmented using the image processing device 100 will be described. FIGS. 13A and 13B are examples of a segmentation result when FIGS. 10A and 10B are input images. Segmentation results 1300 include a cup region A 1303 and a cup region B 1304, and each is expressed as a texture of a different cup type.

The segmentation result by the image processing device 100 is input to the object detection device 1202. The object detection device 1202 receives a detection target designation signal from the storage device 1204. As described above, the detection target designation signal designates container type information determined based on presence or absence of an object belonging to each class (that is, a type and presence or absence of a cup present in an image) and a coordinate position thereof.

First, the object detection device 1202 extracts a combined region from the segmentation result 1300 by the method described in Embodiment 2, and specifies a cup type in the image. Thereafter, the object detection device 1202 estimates a length of the false bottom container based on a position of the extracted combined region. A length L of the false bottom container in pixel unit is estimated by the following equation.

$$L = d2 - 1 + d1$$

Here, d2 is a vertical coordinate position of the lower end of the false bottom container, 1 is a vertical coordinate position of a lower end of a cup region estimated by the image processing device 100, and d1 is a distance from a lower end of the cup to a contact point with the false bottom container. FIG. 15 shows a relationship of parameters in the example in FIG. 10A. The distance d1 from the lower end of the cup to the contact point with the false bottom container is measured in advance for each container type and recorded in the storage device 1204, and is read from the storage device 1204 according to the cup type specified by the object detection device 1202. The vertical coordinate position d2 of the lower end of the false bottom container is assumed to be at the same position in any false bottom container, and is measured in advance and recorded in the storage device 1204. However, if a variation in the lower end of the false bottom container is large, the image processing device 100 may estimate the position of the lower end of the false bottom container separately from the cup region.

Next, the container type is determined based on the specified cup type and the length of the false bottom container. For example, a correspondence table 1400 regarding the cup type and the length of the false bottom container as shown in FIG. 14 is stored in advance in the storage device 1204. In the correspondence table 1400, a horizontal axis indicates the cup type and a vertical axis indicates the length of the false bottom container, and a container type can be automatically determined based on the cup type and the length of the false bottom container specified above using the correspondence table 1400. Regarding the length of the false bottom container, an element having a closest value among candidates in the correspondence table 1400 is selected with respect to the estimated value obtained by the above equation.

The specimen state determination device 902 is a device that determines a state of a sample and/or a container, and determines presence or absence of air bubbles in the sample, presence or absence of inclination of the container, and the like using any existing technique. At this time, by switching a determination algorithm based on the container type output from the object detection device 1202, it is possible to determine the specimen state with higher accuracy.

The sample collection device 903 controls sample collection processing based on a specimen state determination result output from the specimen state determination device 902.

The analysis device 904 executes blood analysis by mixing the sample acquired by the sample collection device 903 with a reagent.

The output device 905 is a device that displays a blood analysis result, and is a monitor, a printer, or the like.

In this way, the image processing device 100 and the object detection device 1202 can identify the container type of the specimen at a high speed and with high accuracy.

The sample collection device 903 controls sample collection based on the specimen state determined by the specimen state determination device 902. For example, when the sample contains air bubbles that affect the analysis, the sample is not collected, and the user is notified of a reason why the sample is not collected, or the specimen is sent to another specimen transport route.

As described above, by determining the container type at a high speed and with high accuracy, the specimen state can be determined with high accuracy, and reliability of the blood analysis is improved.

<Modification>

When a generation image signal is calculated in the feature map generation unit 204 according to Embodiment 1, the generation image signal may be calculated so as to generate a plurality of images according to a score of the generation image signal. In this case, the image generation unit 202 that receives the generation image signal generates a plurality of images based on the generation image signal and outputs the images to the feature extraction unit 203. At this time, the feature map generation unit 204 generates a feature extraction map for each generation image. The feature extraction unit 203 extracts a feature from each pair (combination of the generation image and the feature extraction map) using a generation image group received from the image generation unit 202 and a feature extraction map group received from the feature map generation unit 204.

A type of the feature selected in the feature extraction unit 203 according to Embodiment 1 may not only be a difference in a property of the feature such as a difference in a weighting coefficient of a feature extraction filter, but also be parameters related to an application method such as stride or dilation in convolution processing.

A method for displaying a confidence factor according to Embodiment 3 may be, for example, a method in which a confidence factor display button is disposed on an object arrangement verification result screen, and the user switches ON/OFF of confidence factor superimposition or whether to display an original image or the confidence factor. Embodiment 2 has been described using an example in which the confidence factor is expressed as a luminance value, but the confidence factor may be displayed using a heat map, a contour line, or color-coded for each class. Only pixels having a certain confidence factor or greater may be superimposed and displayed. When a bottle whose confidence factor is determined to be insufficient is present, the bottle or an imaging state tends to be abnormal, and thus a message for prompting the user to review the bottle or the imaging state according to the confidence factor may be displayed.

A method for displaying each individual determination result according to Embodiment 3 may be a method of displaying the confidence factor not only for a finally determined bottle type but also for a plurality of bottle types. The confidence factor to be displayed may be, for example, a maximum value, an average value, or a sum of confidence factors in a combined region, which may be combined with other image processing such as threshold processing or normalization processing.

A method for determining the container type using the image processing system according to Embodiment 2 has been described in the image processing system according to Embodiment 4, but a container state such as presence or absence of a lid or a label may be determined in addition to the container type.

As described above, an image processing device for identifying an object in an image disclosed in Embodiment 1 includes: the image reception unit 201 configured to receive an input image; the image generation unit 202 configured to generate an image for extracting a feature from the input image; the feature extraction unit 203 configured to extract a feature from the generation image generated by the image generation unit; the identification unit 205 configured to identify an object in the image using the feature output from the feature extraction unit; the output unit 206 configured to output an identification result output from the identification unit; and the feature map generation unit 204 configured to instruct the image generation unit to generate a new generation image as necessary based on the feature output from the feature extraction unit 203, and to generate a feature map indicating a feature extraction condition for the new generation image and output the generated feature map to the feature extraction unit 203.

The image generation unit 202 generates a first generation image by reducing the input image, and the feature map generation unit 204 instructs generation of a new generation image with a reduced reduction ratio when it is determined that the already extracted feature is insufficient for the identification.

In this way, a target object in the image can be identified with high accuracy and at a high speed by starting processing from the generation image having a high reduction ratio and using the generation image with a reduced reduction ratio as necessary.

The feature map generation unit 204 specifies a region where the already extracted feature is insufficient for the identification, and generates a feature map that designates the region as a range for extracting a feature.

In this way, by excluding a region where a feature sufficient for the identification is obtained, limiting the range for extracting a feature, and executing feature extraction again, a target object in an image can be identified with high accuracy and at a high speed.

The feature map generation unit 204 determines a generation condition for the new generation image and a type of a feature to be extracted from the new generation image based on an existing feature extraction result.

Therefore, a type and the reduction ratio of the generation image, and the type of the feature to be extracted can be appropriately changed, and a target object in an image can be identified with high accuracy and at a high speed.

When a predetermined condition is satisfied, the feature map generation unit 204 outputs, to the identification unit 205, an extraction end signal indicating an end of feature extraction processing, and when receiving the extraction end signal, the identification unit 205 identifies an object in the image by comprehensively using features related to one or more generation images generated so far.

Therefore, it is possible to eliminate an unnecessary processing load, efficiently generate a necessary feature, and identify a target object in an image with high accuracy and at a high speed.

The feature map generation unit 204 executes temporary identification using a part or all of features extracted by the feature extraction unit 203 so far, and generates a feature extraction map based on a confidence factor of the identification.

Therefore, it is possible to accurately determine necessity of new feature extraction.

A feature extraction map output from the feature map generation unit 204 may be output to outside via the output unit.

By outputting the feature extraction map to the outside, it is possible to provide information on what kind of identification processing is being executed.

An image processing system for detecting an object in an image at a high speed disclosed in Embodiment 2 includes: the imaging device 1201 configured to obtain the input image by imaging a target object; the image processing device 100 disclosed in Embodiment 1; the object detection device 1202 configured to detect the target object based on the identification result output from the image processing device 100 and detection target information output from the storage device 1204; the storage device 1204 configured to output the detection target information for designating a target to be detected by the object detection device 1202; and the display device 1203 configured to present, to a user, an object detection result output from the object detection device 1202.

According to a configuration described in Embodiment 2, it is possible to detect a detection target object in an image at a high speed.

In the image processing system disclosed in Embodiment 3, it is also possible to display information suggesting that a possibility such as "object arrangement is switched" or "a label orientation is wrong" using an object identification result or a feature extraction map.

The invention is not limited to the embodiments described above, and includes various modifications. For example, the embodiments described above have been described in detail to facilitate understanding of the invention, and the invention is not necessarily limited to those including all the configurations described above. The components may not only be deleted, but also be replaced or added.

REFERENCE SIGNS LIST

100: image processing device
110: interface unit
111: calculation unit
112: memory
113: bus
201: image reception unit
202: image generation unit
203: feature extraction unit
204: feature map generation unit
205: identification unit
206: output unit
500: image processing method
501: image reception step
502: image generation step
503: feature extraction step
504: feature map generation step
505: identification step
506: output step
1200: image processing system
1201: imaging device
1202: object detection device
1203: display device
1204: storage device
1400: correspondence table

The invention claimed is:

1. An image processing device for identifying an object in an image, comprising:

an image reception unit configured to receive an input image;

an image generation unit configured to generate an image for extracting a feature from the input image;

a feature extraction unit configured to extract a feature from the generation image generated by the image generation unit;

an identification unit configured to identify an object in the image using the feature output from the feature extraction unit;

an output unit configured to output an identification result output from the identification unit; and a feature map generation unit configured to instruct the image generation unit to generate a new generation image as necessary based on the feature output from the feature extraction unit, and to generate a feature map that designates a region from which the feature is to be extracted with respect to the new generation image and that designates, for each region, a type of the feature to be extracted and output the generated feature map to the feature extraction unit.

2. The image processing device according to claim 1, wherein the image generation unit generates a first generation image by reducing the input image, and the feature map generation unit instructs generation of a new generation image with a reduced reduction ratio when it is determined that the already extracted feature is insufficient for the identification.

3. The image processing device according to claim 1, wherein the feature map generation unit specifies a region where the already extracted feature is insufficient for the identification, and generates a feature map that designates the region as a range for extracting a feature.

4. The image processing device according to claim 1, wherein the feature map generation unit determines a generation condition for the new generation image and a type of a feature to be extracted from the new generation image based on an existing feature extraction result.

5. The image processing device according to claim 1, wherein when a predetermined condition is satisfied, the feature map generation unit outputs, to the identification unit, an extraction end signal indicating an end of feature extraction processing, and when receiving the extraction end signal, the identification unit identifies an object in the image by comprehensively using features related to one or more generation images generated so far.

6. The image processing device according to claim 1, wherein the feature map generation unit executes temporary identification using a part or all of features extracted by the feature extraction unit so far, and generates a feature extraction map based on a confidence factor of the identification.

7. The image processing device according to claim 1, wherein a feature extraction map output from the feature map generation unit is output to outside via the output unit.

8. An image processing system for detecting an object in an image at a high speed, the system comprising:

an imaging device configured to obtain an input image by imaging a target object;

the image processing device according to claim 1 configured to output a segmentation result or an identification result based on the input image output from the imaging device;

a storage device configured to output a detection target designation signal for designating a detection target as a detection-related designation signal that is a signal for designating a setting or information related to detection;

an object detection device configured to detect an object based on the segmentation result or the identification result output from the image processing device and the detection target designation signal output from the storage device; and a display device configured to present, to a user, an object detection result output from the object detection device.

9. The image processing system according to claim 8, wherein the image processing device outputs the segmentation result based on the input image, the storage device outputs, as the detection-related designation signal, a detection target designation signal for detecting arrangement information on a plurality of objects present in the input image, and a proper arrangement state designation signal of the target object preset by the user, the object detection device receives the segmentation result and the detection target designation signal and detects the arrangement information on the plurality of objects present in the image, the image processing system further comprises an object arrangement verification device configured to verify whether arrangement of the target object is proper based on the arrangement information on the objects output from the object detection device and the proper arrangement state designation signal output from the storage device, and the display device presents, to the user, an object arrangement verification result output from the object arrangement verification device.

10. The image processing system according to claim 8, wherein the imaging device acquires the input image by imaging a container storing a sample, the image processing device outputs the segmentation result or the identification result based on the input image, the storage device outputs, as the detection-related designation signal, a detection target designation signal for detecting a type of the container present in the input image, and a sample state determination target designation signal and/or a container state determination target designation signal for determining a state of the sample and/or the container, the object detection device determines the type of the container based on the segmentation result or the identification result and the detection target designation signal, the image processing system further comprises a specimen state determination device configured to determine the state of the sample and/or the container based on the type of the container output from the object detection device, and the sample state determination target designation signal and/or the container state determination target designation signal output from the storage device, a sample collection device configured to control collection of the sample based on the state of the sample and/or the container determined by the specimen state determination device, and an analysis device configured to execute blood analysis by mixing the sample collected by the sample collection device with a reagent, and the display device presents, to the user, a blood analysis result by the analysis device.

11. An image processing method for identifying an object in an image, the method comprising:

an image reception step of receiving an input image;

an image generation step of generating an image for extracting a feature from the input image;

a feature extraction step of extracting a feature from the generation image generated in the image generation step;

an identification step of detecting or identifying an object in the image using the feature extracted in the feature extraction step;

an output step of outputting an identification result outputted in the identification step; and a feature map generation step of generating, in the image generation step, a new generation image as necessary based on the feature output in the feature extraction step, and generating a feature map that designates a region from which the feature is to be extracted with respect to the new generation image in the feature extraction step and that designates, for each region, a type of the feature to be extracted.

12. The image processing method according to claim 11, wherein in the image generation step, a first generation image is generated by reducing the input image, and in the feature map generation step, generation of a new generation image with a reduced reduction ratio is instructed when it is determined that the already extracted feature is insufficient for the identification.

13. The image processing method according to claim 11, wherein in the feature map generation step, a region where the already extracted feature is insufficient for the identification is specified, and a feature map that designates the region as a range for feature extraction is generated.

14. The image processing method according to claim 11, wherein in the feature map generation step, temporary identification is executed using a part or all of features extracted so far in the feature extraction step, and a feature extraction map is generated based on a confidence factor of the identification.

15. The image processing method according to claim 11, wherein a feature extraction map output in the feature map generation step is output to outside in the output step.

* * * * *